United States Patent
Andreopoulos

(10) Patent No.: US 11,361,214 B2
(45) Date of Patent: Jun. 14, 2022

(54) DYNAMIC MULTISCALE ROUTING ON NETWORKS OF NEUROSYNAPTIC CORES

(71) Applicant: INTERNATIONAL BUSINESS MACHINES CORPORATION, Armonk, NY (US)

(72) Inventor: Alexander Andreopoulos, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1096 days.

(21) Appl. No.: 15/406,211

(22) Filed: Jan. 13, 2017

(65) Prior Publication Data

US 2018/0204114 A1 Jul. 19, 2018

(51) Int. Cl.
*G06N 3/04* (2006.01)
*G06N 3/063* (2006.01)

(52) U.S. Cl.
CPC .......... *G06N 3/049* (2013.01); *G06N 3/063* (2013.01); *G06N 3/0454* (2013.01)

(58) Field of Classification Search
CPC ....... G06N 3/049; G06N 3/0454; G06N 3/063
See application file for complete search history.

(56) References Cited

U.S. PATENT DOCUMENTS

| | | | |
|---|---|---|---|
| 8,369,652 B1 | 2/2013 | Khosla et al. | |
| 9,195,903 B2 * | 11/2015 | Andreopoulos | G06K 9/4676 |
| 9,196,053 B1 | 11/2015 | Huber et al. | |
| 2006/0215922 A1 | 9/2006 | Koch et al. | |
| 2014/0219497 A1 | 8/2014 | Richert | |
| 2014/0258195 A1 | 9/2014 | Weng et al. | |
| 2015/0269439 A1 | 9/2015 | Versace et al. | |
| 2016/0004931 A1 | 1/2016 | Andreopoulos et al. | |

FOREIGN PATENT DOCUMENTS

EP   2256667 A1   12/2010

OTHER PUBLICATIONS

Indiveri, Neuromorphic VLSI Models of Selective Attention: From Single Chip Vision Sensors to Multi-chip Systems (Year: 2008).*
Taba, Visual saliency on networks of neurosynaptic cores (Year: 2015).*
Sonnleithner, A Neuromorphic Saliency-Map based Active Vision System (Year: 2011).*
Vogelstein, A Multichip Neuromorphic System for Spike-Based Visual Information Processing (Year: 2007).*
D. Sonnleithner and G. Indiveri, "A Neuromorphic Saliency-Map based Active Vision System," (2011).

* cited by examiner

*Primary Examiner* — Abdullah Al Kawsar
*Assistant Examiner* — Tewodros E Mengistu
(74) *Attorney, Agent, or Firm* — Erik A. Huestis; Stephen J. Kenny; Foley Hoag LLP

(57) ABSTRACT

Dynamic multiscale routing on networks of neurosynaptic cores with a feedback attention beam and short term memory with inhibition of return is provided. In various embodiments, an input topographic map is received at a spiking neuromorphic hardware system. A saliency map is received, associating a saliency value with each of a plurality of regions of the input topographic map. Based on the saliency map, a first of the plurality of regions in order of saliency value is routed. The first of the plurality of regions is suppressed. Based on the saliency map, a predetermined number of the plurality of regions are sequentially routed in order of saliency value.

14 Claims, 15 Drawing Sheets

DYNAMIC MULTISCALE ROUTING ON NETWORKS OF NEUROSYNAPTIC CORES

BACKGROUND

Embodiments of the present invention relate to routing on networks of neurosynaptic cores, and more specifically, to dynamic multiscale routing on networks of neurosynaptic cores with a feedback attention beam and short term memory with inhibition of return.

BRIEF SUMMARY

According to various embodiments of the present disclosure, neurosynaptic systems, methods and computer program products for dynamic multiscale routing are provided. An input topographic map is received at a spiking neuromorphic hardware system. A saliency map is received, associating a saliency value with each of a plurality of regions of the input topographic map. Based on the saliency map, a first of the plurality of regions in order of saliency value is routed. The first of the plurality of regions is suppressed. Based on the saliency map, a predetermined number of the plurality of regions are sequentially routed in order of saliency value.

DETAILED DESCRIPTION

Figure 1:
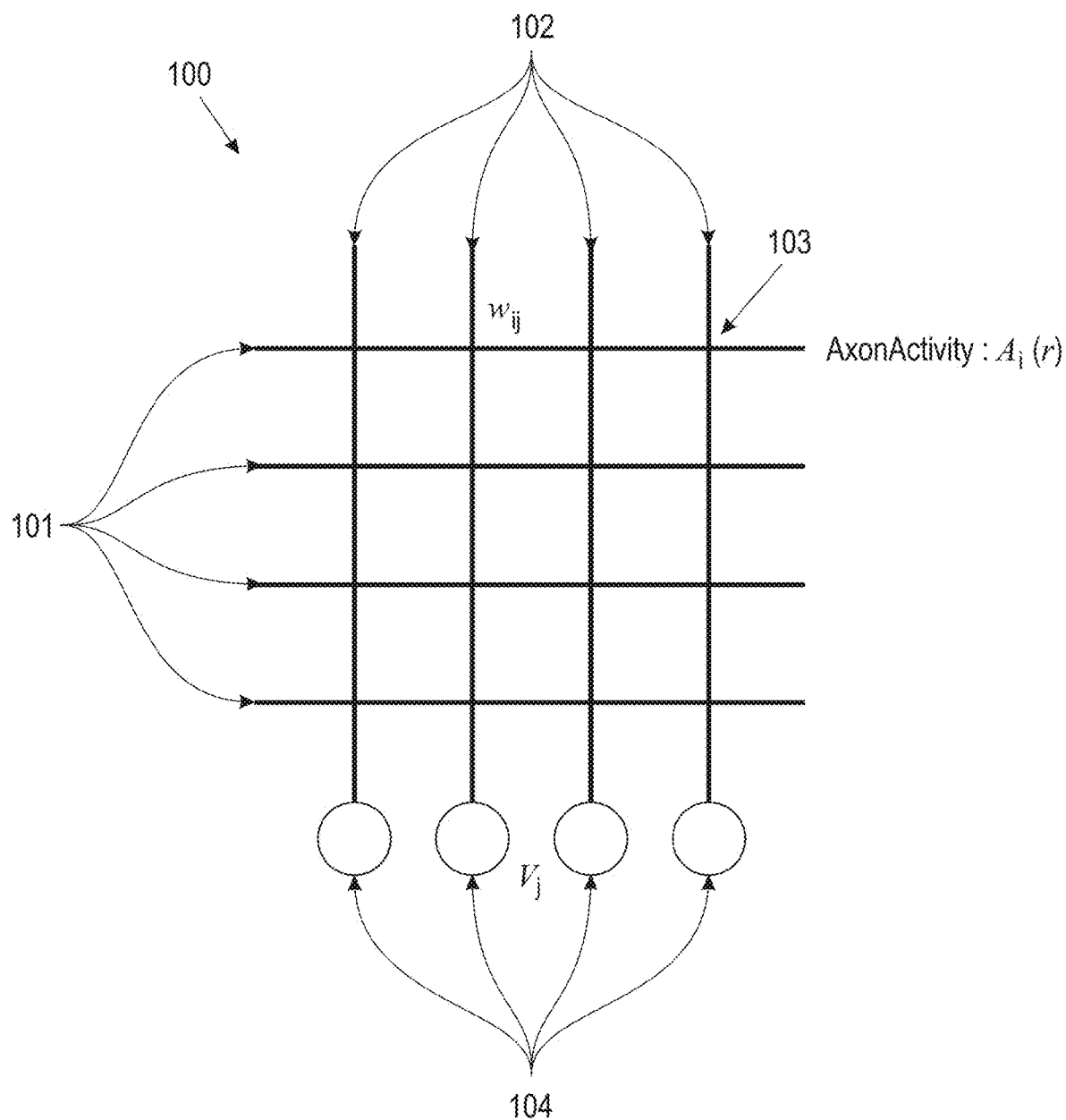
FIG. 1 depicts a neurosynaptic core according to embodiments of the present disclosure.
Figure 2:
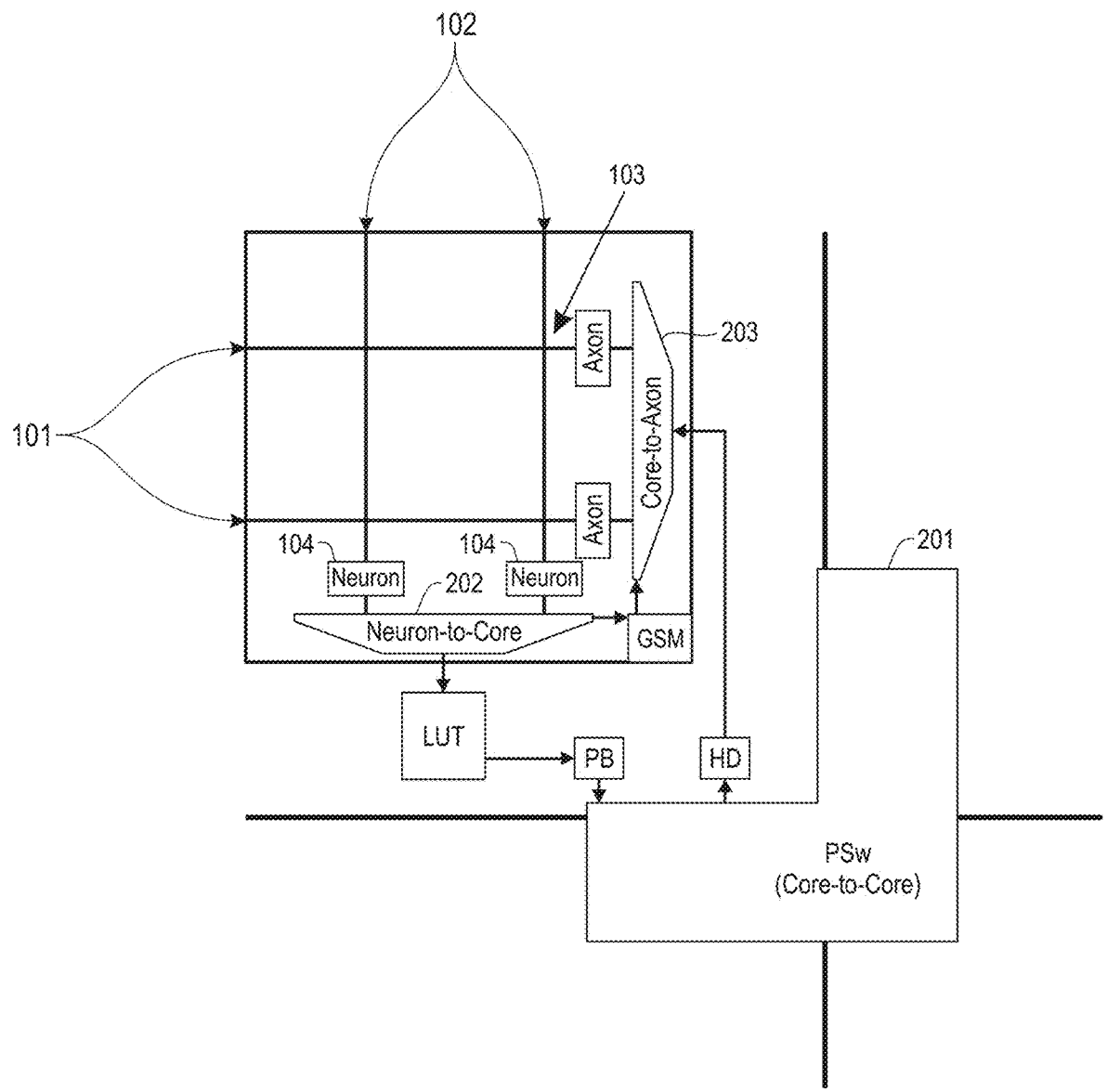
FIG. 2 depicts a neurosynaptic core and mesh router according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

In various exemplary neuromorphic systems, such as TrueNorth, neuron activity may be described by the following equations. In particular, synaptic integration is provided according to Equation 1. Leak integration is provided according to Equation 2 and Equation 3. At each tick, a spike is generated where a threshold potential is crossed. In particular, for according to Equation 4, if $V_j(t) \geq \alpha_j + \eta_j$, then a spike is generated and $V_j(t)$ is reset according to Equation 5. If $V_j(t) \leq -[\beta_j \kappa_j + (\beta_j + \eta_j)(1 - \kappa_j)]$, $V_j(t)$ is reset according to Equation 6.

$$V_j(t) = V_j(t-1) + \sum_{i=0}^{255} A_i(t)\omega_{i,j}\left[\left(1 - b_j^{G_i}\right)s_j^{G_i} + b_j^{G_i} F(s_j^{G_i}, \rho_{i,j}) \operatorname{sgn}(s_j^{G_i})\right]$$ Equation 1

$$\Omega = (1 - \epsilon_j) + \epsilon_j \operatorname{sgn}(V_j(t))$$ Equation 2

$$V_j(t) = V_j(t) + \Omega[(1 - c_j^\lambda)\lambda_j + c_j^\lambda F(\lambda_j, \rho_j^\lambda) \operatorname{sgn}(\lambda_j)]$$ Equation 3

$$\eta_j = \rho_j^T \,\&\, M_j$$ Equation 4

$$V_j(t) = \delta(\gamma_j)R_j + \delta(\gamma_j - 1)(V_j(t) - (\alpha_j + \eta_j)) + \delta(\gamma_j - 2)V_j(t)$$ Equation 5

$$V_j(t) = -\beta_j \kappa_j + [-\delta(\gamma_j)R_j + \delta(\gamma_j - 1)V_j(t) + (\beta_j + \eta_j)) + \delta(\gamma_j - 2)V_j(t)](1 - \kappa_j)$$ Equation 6

In various neuron specifications, different symbols may be used for the various neuron parameters above. For example: sigma(i)S(i)=$s_j^{G_i-1}$ (for i=1, 2, 3, 4); alpha=$\alpha_j$; lmda*sigma_l=$\lambda_j$; epsilon=$\epsilon_j$; beta=$\beta_j$; kappa=$k_j$; gamma=$\gamma_j$; sigmaVR*($2^{VR}-1$)=$R_j$, $V_m$=$V_j(0)$. When not expressly defined, the above may be assumed have a default value of 0. In general, i is used as an index to a corresponding array, as in sigma(i) or S(i). In Equation 4, $\eta_j = \rho_j^T \& M_j$ denotes the logical AND of a random number generator $\rho_j^T$ with the first $M_j$ bits of its binary representation. For example, for $M_j$=8, this returns a random 8 bit number in 0-255 and for $M_j$=0, $\eta_j$ is always zero (and thus is not random). This is useful for stochastic rate store neurons.

A significant challenge in the construction of neuromorphic cognitive systems is the routing problem. In fact, no solutions to the routing problem have been shown to work on spiking/neuromorphic architectures. In particular, given an input topographic map, as well as information specifying a particular compact and contiguous subset of the map (referred to as an attention target), there is a need for a spiking-based neural network architecture to efficiently route that subset of the map to another secondary processing module.

The present disclosure provides an architecture for spiking neuromorphic systems that is amenable to top-down/contextual biases. In some embodiments, feedforward, feedback, recursive and laterally excitatory control & gating signals are used. Alternative approaches lack the power efficiency of spiking neuromorphic systems, which may operate at about 0.05 watts. Von Neumann architectures for cognitive computing problems, such as vision, are also inadequate due to the high number of gates needed to run these systems on von Neumann architectures as the environment complexity increases.

In some embodiments, a multiscale representation of each image is used for efficient image search. In some embodiments, multiple saccades per frame are allowed by maintaining a state of each frame. In some embodiments, inhibition of return is provided on a single frame. In some embodiments, inhibitory priors are provided. In some embodiments, dynamically controlled inhibition of return size is provided. In some embodiments, quadrant selection for robust localization is provided so that the object/region of interest is not cropped.

It will be appreciated from the below, that systems according to the present disclosure operate in continuous mode, which enables processing sequences of distinct topographic maps (e.g., video sequences). This significantly increases its complexity due to the synchronization pulses necessary to make the system work correctly under arbitrary input parameters.

A topographic map refers to a function $f$: $[1, \ldots, M] \times [1, \ldots, N] \rightarrow [0, 1, \ldots, R]$. Such topographic maps can arise in a variety of situations that emerge in cognitive systems such as vision (e.g., denoting the intensity of each pixel in a frame from a video sequence), audition (e.g., the short time Fourier transform), touch (e.g., to specify the pressure intensity on each point of a 2D surface) as well as any other set of information that is mappable to such a topographic map.

In various embodiments, secondary processing may include, for example, an object recognition system. The recognition system may take as input the routed pixels and output a set of labels indicating which objects are present in the input subset of the image. One approach would be to apply multiple distinct copies of the recognition module to each subset of the image, since this does not require routing each subset of the image. However, this approach does not scale well space-wise since the number of neurons required to do this is in general intractable.

Accordingly, the present disclosure provides for both time and space efficiency. Space-wise efficiency includes the need to minimize the number of neurons used in order to make the solution power-wise and cost-wise efficient. Time-wise efficiency includes the need to route pixels quickly, since commercially competitive cognitive systems (such as vision systems for example) may need to operate in real-time. In the case of vision, the human visual system provides a useful benchmark for real-time performance. The human visual system does visual search at a speed of around 3 saccades per second, and this is sufficient for humans to interact robustly (in most situations) with their environment. While faster vision systems may be required in certain situations (e.g., industrial inspection systems) the 3 saccade bound provides a lower bound on the foveation speed that a commercially viable solution to the routing problem should exhibit.

According to various embodiments of the present disclosure, a routing system is provided using the TrueNorth architecture that operates on sequences of high resolution topographic maps (e.g., frame sequences from a video sequence or sequences of complex audio features). However, it will be appreciated that the routing system herein described is suitable for a variety of spiking neuromorphic systems, of which TrueNorth is an example.

The routing algorithm according to various embodiments of the present disclosure uses gating neurons. Exemplary embodiments of such gating neurons are provided in commonly invented and assigned application Ser. No. 15/405,824, entitled DYNAMIC GATING USING NEUROMORPHIC HARDWARE, which is hereby incorporated by reference in its entirety.

Given a low resolution map of attention targets, where each attention target is assigned a rank of importance (which may be referred to as a saliency map), systems of the present disclosure serially route the corresponding high resolution topographic map regions specified by the attention targets in the order of their assigned importance. The router scales linearly or sublinearly (both time-wise and space-wise) with respect to the size of each saliency map and high resolution topographic map, and efficiently achieves important tasks that a commercially viable router needs to achieve. As described further below, these tasks may include the ability to attend multiple times on a single frame, an inhibition of return mechanism, the ability to specify inhibitory priors, multiscale map search which helps with the localization of the centroids of regions of interest, and a quadrant selection mechanism that addresses the problem of outputting a pyramid of increasingly larger topographic map subsets making it useful for processing regions of interest which do not fit in a single sized patch (such as large objects in the case of vision).

In various embodiments, a neuromorphic system takes as input streams of frames from a video sequence. Each frame consists of a saliency map, as well as a high resolution map/image. No assumptions are made about the size of the saliency map or the particular algorithm that generated it. The system uses the saliency map to sequentially route subsets of the high resolution map in their order of importance, as specified by the lower resolution saliency map. The number of saccades per frame is configurable, and denotes the number of highest ranked patches that will be routed to the output. At the end of each saccade, the system inhibits the previously attended region by suppressing the appropriate region in the saliency map. This provides a spiking based inhibition of return mechanism.

After executing the saccades assigned to each frame, control pulses are responsible for properly resetting the system in preparation of processing the next input frame/map. An external control signal may also be taken as input specifying how large the inhibition region should be. This is useful when there is prior knowledge about the nature of the object that is located at the corresponding high resolution map region. For example in the case of vision, if it is known that large truck objects are present, the signal could specify a large inhibitory region to decrease the probability of attending twice on the surface of the object. The saliency map goes through a Gaussian pyramid which provides lower scale versions of the saliency map. The top pyramid layer is sufficiently small (in the exemplary 5-layer system described below, the top layer is 15×9 pixels) and can therefore be processed efficiently by an argmax corelet that returns the highest ranked pixel through a global max operation.

The argmax function can also take a tie-breaking parameter specifying a location-based ranking of pixels which may have the same rank. This is useful in regions of uniform saliency since a foveation bias can be specified towards the center of the equal saliency value blob, making it easier to find the centroid. The winning pixel is then backprojected down a 5 layer pyramid, where the fan-out of each pixel matches the fan-in of each pixel in the Gaussian pyramid (it is dependent on the support region of the Gaussian kernel, which is 5×5 pixels in the exemplary embodiment described below). This guarantees that the backprojected attention beam contains any regions that could have contributed to the winning pixel/region in the top layer.

As the data is backprojected down the pyramid, it increments certain counter gates, whose responsibility is to let through a single winning pixel that has gathered enough votes. The top layer's counter is responsible for choosing a patch in Layer 4 of the multiscale retinotopic map, which is sent to another argmax function. The low cost of these argmax functions, due to the use of a multiresolution approach to object localization, makes the use of complex WTA routines unnecessary. This process is repeated until the region centroid has been localized at the highest resolution layer (five times in the exemplary embodiment described below). The resultant focus of attention is also used to provide the inhibitory region for the next saccade.

With each backprojection down the pyramid, time division demultiplexing corelets (e.g., gating neurons) are used in conjunction with control signals, to send the results of the argmax function to the appropriate region in the feedback pyramid. As backprojecting proceeds down the pyramid, control signals are sent to the quadrant indexing corelets (which may comprise another set of gating neurons) which select the quadrant at each layer containing the object of interest. The input of each quadrant indexing mechanism is a global saliency map. Each quadrant indexing mechanism also receives as input all the previously chosen quadrants since this is necessary information for it to choose the appropriate quadrant in the current layer. The quadrant indexing corelets in turn are responsible for choosing a high resolution image quadrant (relying again on gating neurons) from the stored gated neurons.

In various embodiments, the system operates on video streams, implying that it uses a large number of synchronization neurons (which may be on the order of tens of thousands) which are responsible for resetting, probing, and rounding. These neurons have different phases and frequencies, contributing to the complexity of various implementations according to the present disclosure.

The present disclosure provides various embodiments of complex systems utilizing different neuron gates. For example, vision systems are useful for factory and office automation, optical character systems, assembly line inspection, chip defect identification, medical imaging, defence and biometrics. The present disclosure enables low-power solutions for mining the large quantities of data generated from such systems. The low power requirements also make the present disclosure applicable in mobile vision applications related to robotics or UAV surveillance.

Referring to FIGS. 3-13, an exemplary multiscale router according to embodiments of the present disclosure is illustrated.

Figure 3:
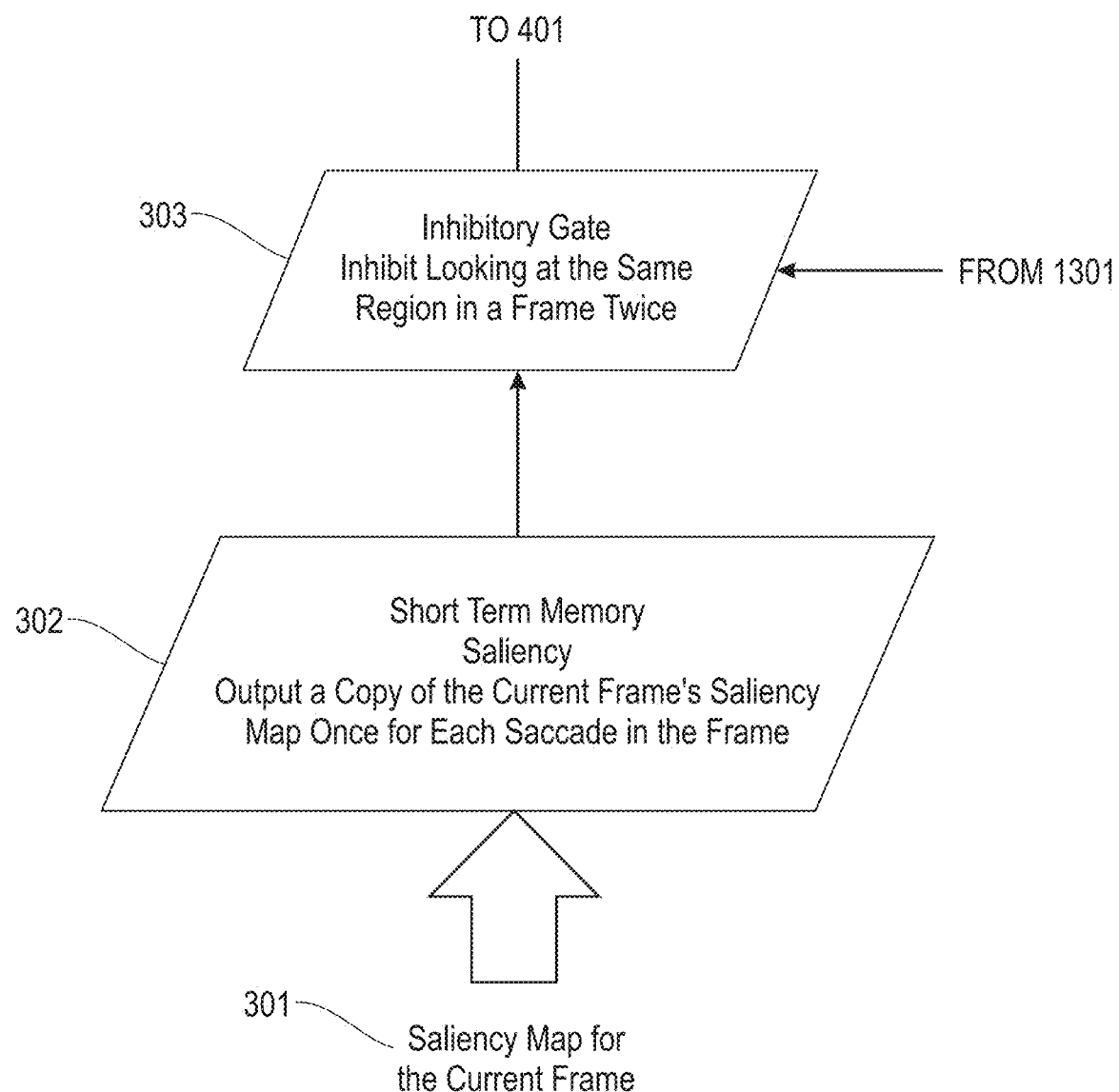
FIG. 3 illustrates a first portion of exemplary multiscale routing according to embodiments of the present disclosure.

In FIG. 3, a saliency map for a current frame is received at 301. At 302, a copy of the saliency map is output once for each saccade in the current frame from short term memory. At 303, an inhibitory gate inhibits looking at the same region in a frame twice. In some embodiments, the inhibitory gate accepts as input the rate coded representation of the saliency map, and also accepts as input (from the right side of the figure) "close" control pulses which selectively inhibit regions that are not to be visited again.

In some embodiments, the gate can selectively close neurons in a core so that no information passes through them for multiple frames (not just a single frame). Assuming a frame-based system with a maximum of maxSpikesPerFrame input spikes per frame, the gate only accepts close control spikes and reset control spikes (no open control spikes). If numSpikeClose close spikes occur before any input arrives since the last reset, then the gate is guaranteed closed for numSpikesClose frames (does not permit any input spikes through). On reset the gate is open (lets through any inputs). The globalCtrlClose option can be used to gate/close all neurons in a core simultaneously, while the local control axon can be used to control each gate individually (it is possible to include all axon types simultaneously in the user interface). This is particularly important if we want to implement an inhibition of return like mechanism for example. By default the gate is open during the first frame. The reset takes place within two ticks. The first reset pulse first sets the neuron to its fully closed state and the second reset pulse increases the potential by +254 setting the gate to its open state. If a 1 tick reset is needed and you can assume a maximum of 1 spike (binary) input, then one of the previously described gates is better.

Figure 4:
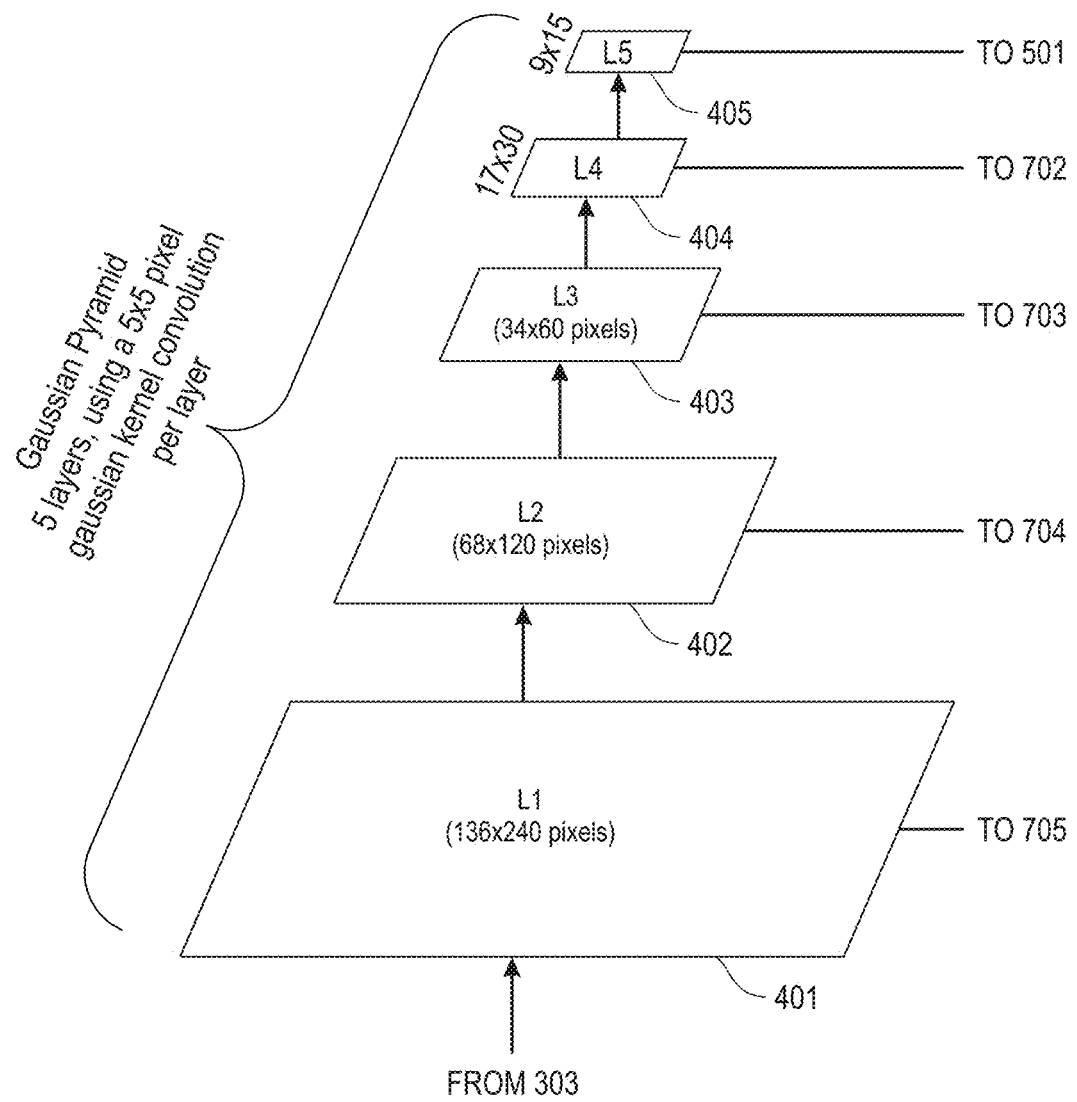
FIG. 4 illustrates a second portion of exemplary multiscale routing according to embodiments of the present disclosure.
Figure 7:
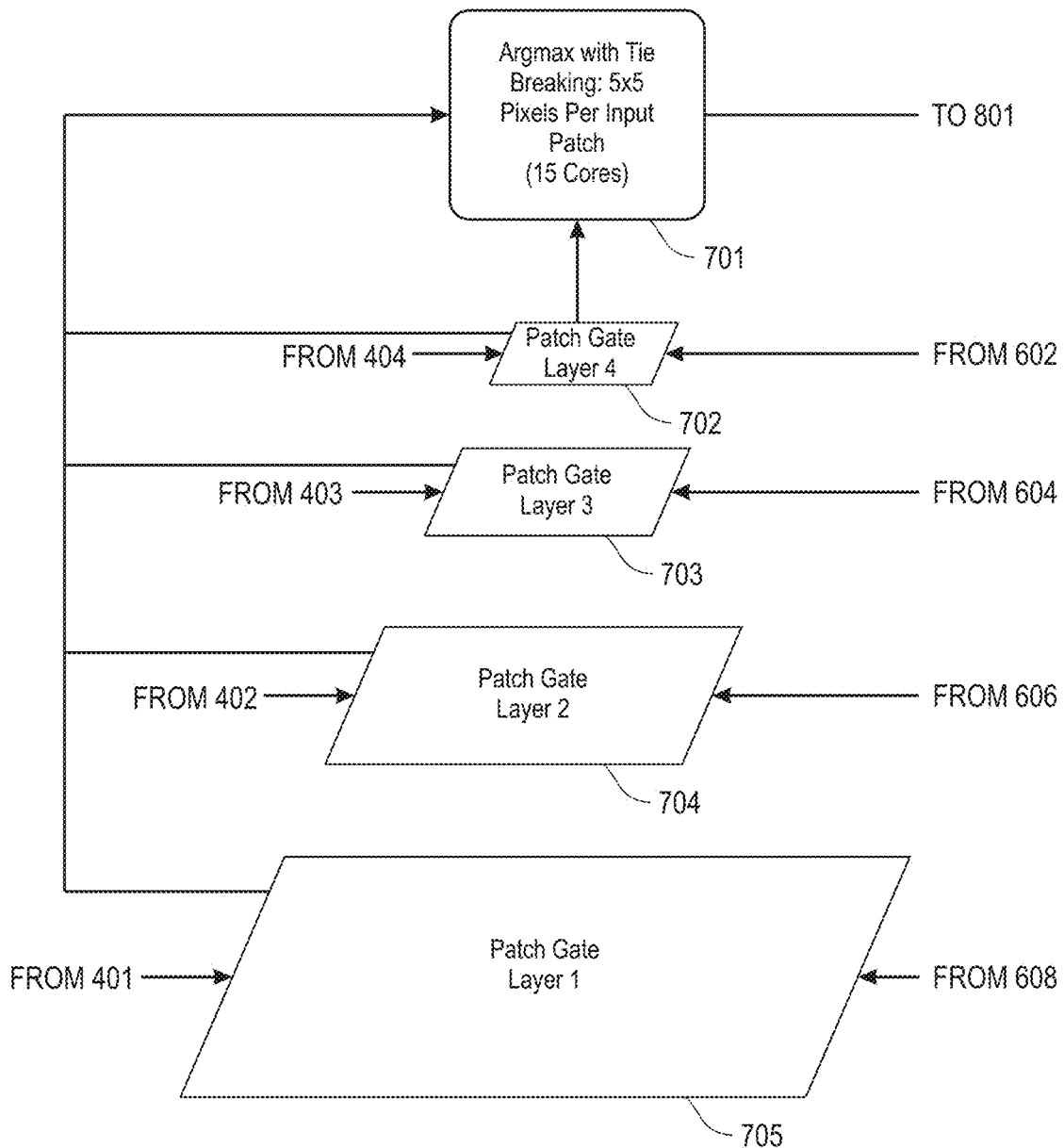
FIG. 7 illustrates a fifth portion of exemplary multiscale routing according to embodiments of the present disclosure.

In FIG. 4, a gaussian pyramid is created from the inhibited saliency map as described with reference to FIG. 3. Each pyramid layer 401 . . . 405 is duplicated and sent to another set of gating neurons (as illustrated in FIG. 7) which will later be responsible for choosing which subset of 5×5 pixels to send to an argmax operator. In this exemplary embodiment, five layers are provided, having 136×240, 68×120, 34×60, 17×30, 9×15 pixels respectively. However, it will be appreciated that a variety of resolutions may be used in various embodiments. Likewise, the Gaussian pyramid provided herein uses a 5×5 pixel Gaussian kernel convolution per layer, but it will be appreciated that alternative transformation may be used in accordance with the present disclosure.

Figure 5:
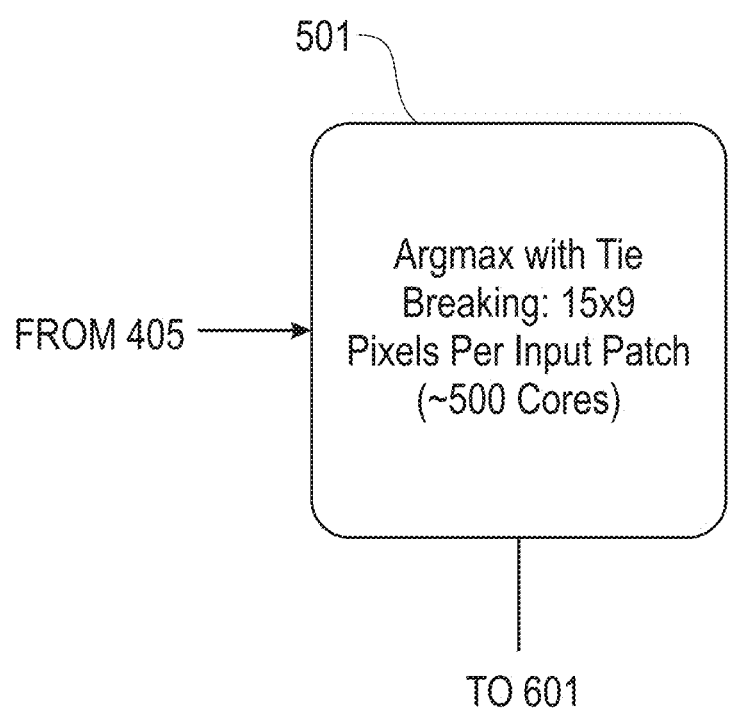
FIG. 5 illustrates a third portion of exemplary multiscale routing according to embodiments of the present disclosure.

In FIG. 5, a corelet 501 takes as input the 15×9 pixel L5 layer 405 of the Gaussian pyramid, and is responsible for finding the pixel in the map with the highest response. The output is used by the top layer of the feedback inhibitory beam pyramid shown in FIG. 6.

Figure 6:
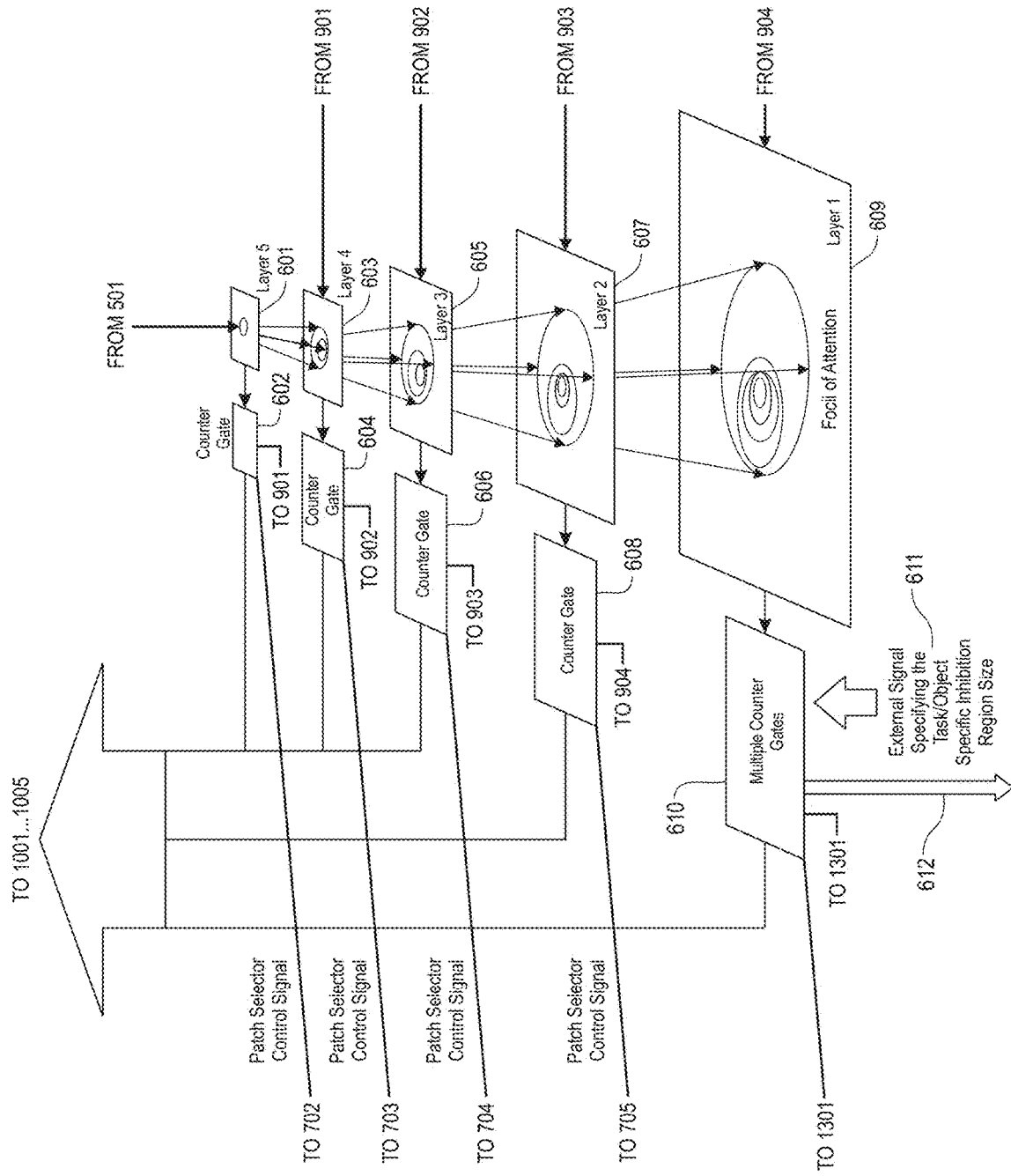
FIG. 6 illustrates a fourth portion of exemplary multiscale routing according to embodiments of the present disclosure.

In FIG. 6, the output from 501 is sent to top layer 601, which in turn activates in each of the feedback layers 603, 605, 607, 609 the regions which could have contributed to this maximum value (circumscribed in layers 601, 603, 605, 607, 609). The counter gate neurons 602, 604, 606, 608 that map to these regions are also incremented by 1. In some embodiments, the counter gates comprise neurons with only "open" gates which fire once, when a particular gate neuron has accumulated sufficient votes to indicate that we have localized the most accurate position for the max. In Layer 5 601 the counter gate threshold 602 is 1, in Layer 4 603 the threshold 604 is 2, in Layer 3 605 the threshold 606 is 3, in Layer 2 607 the threshold 608 is 4, and in Layer 1 609 the threshold 610 is 5. With each iteration, the size of the attention beam is pruned, achieving the localization of the object. An external signal 611 is received specifying the task or object specific inhibition region size. The localized centroid of the object is output 612. The inhibitory region is output from gate 610 to inhibitory memory beam 1301.

In FIG. 7, the counter gate neurons from the previous step fire once to denote the 5×5 pixel patch from the layer below which could have contributed to the max value found in the layer above. The patch gate is implemented using gate neurons with global control open axons, which make it possible to release the full 5×5 patch pixels using a single neuron's control pulse generated in step 4 (otherwise expensive splitter neurons would be needed). For example the Layer 5 max location found in step 4, activated the corresponding patch in Layer 4 of step 5. This patch activation releases the corresponding 5×5 patch saliency map pixels that were stored during step 2. The 5×5 patch (from any layer) is sent to the same argmax corelet (BUSOR) which finds the pixel in the 5×5 patch with the highest value.

In some embodiments, the gate neurons are configured to release the gated/stored input spikes, when the gate is not fully closed, thus enabling the release of only part of the stored information. The gate can be closed and opened multiple times between frames. This gate is meant to accept at most maxSpikesPerFrame input spikes between every pair of reset spikes. It also uses open control spikes, and optional close spikes. If numSpikesOpen more open spikes are received than close spikes, then the gate becomes open and it lets through any input spikes entered since the last reset and until the next reset. Note that at any time, the number of close spikes must be at most equal to the number of open spikes that have occurred since the last reset. Upon reset the gate is set to its closed state. However for the first frame the gate is set to the open state. It is also possible to re-close the gate without a reset, by using at most numSpikesOpen close pulses, in which case the same number of open pulses are needed to reopen the gate. So the number of close and open can be thought of as encoding how fully the gate is closed.

Figure 8:
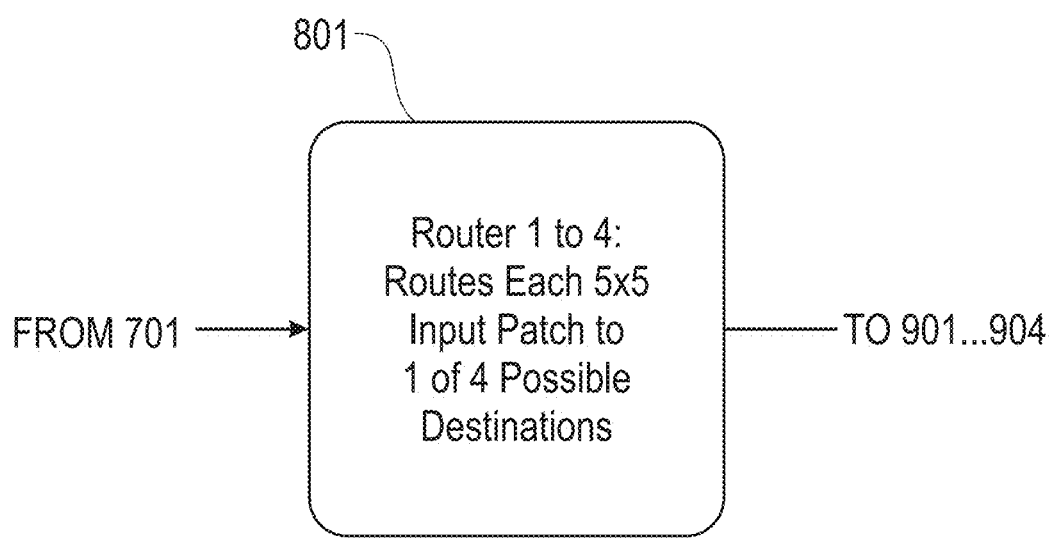
FIG. 8 illustrates a sixth portion of exemplary multiscale routing according to embodiments of the present disclosure.

In FIG. 8, the argmax output 701 is then sent to a one-to-many router 801 (e.g., a time division demultiplexer) responsible for sending the binary output map of the argmax corelet (which indicates the winning pixel in the 5×5 pixel patch) to the correct layer of the feedback pyramid, to further refine the localization of the max response. This router may be implemented using gate neurons. Periodically spiking synchronization neurons are connected to the "open" axons of the router and are responsible for adjusting the destination layer of the input (the input is the 5×5 output of the argmax).

In some embodiments, for each frame the gate fires a single spike if at least a certain number of input spikes have entered and the control axons have opened the gate. The gate accepts a maximum of maxSpikesPerFrame spikes from its input axon during each frame period. If during that period numSpikesOpen more open control pulses are entered than close control pulses, then the gate examines whether the number of input spikes during the frame were at least 0, in which case a single spike is output. The close control axons are optional in the gate's user-interface. There is also a reset control axon which resets the gate to its closed state. Note that each close pulse effectively cancels an open pulse, so a close pulse is only effective if there were previous open pulses for this frame.

Figure 9:
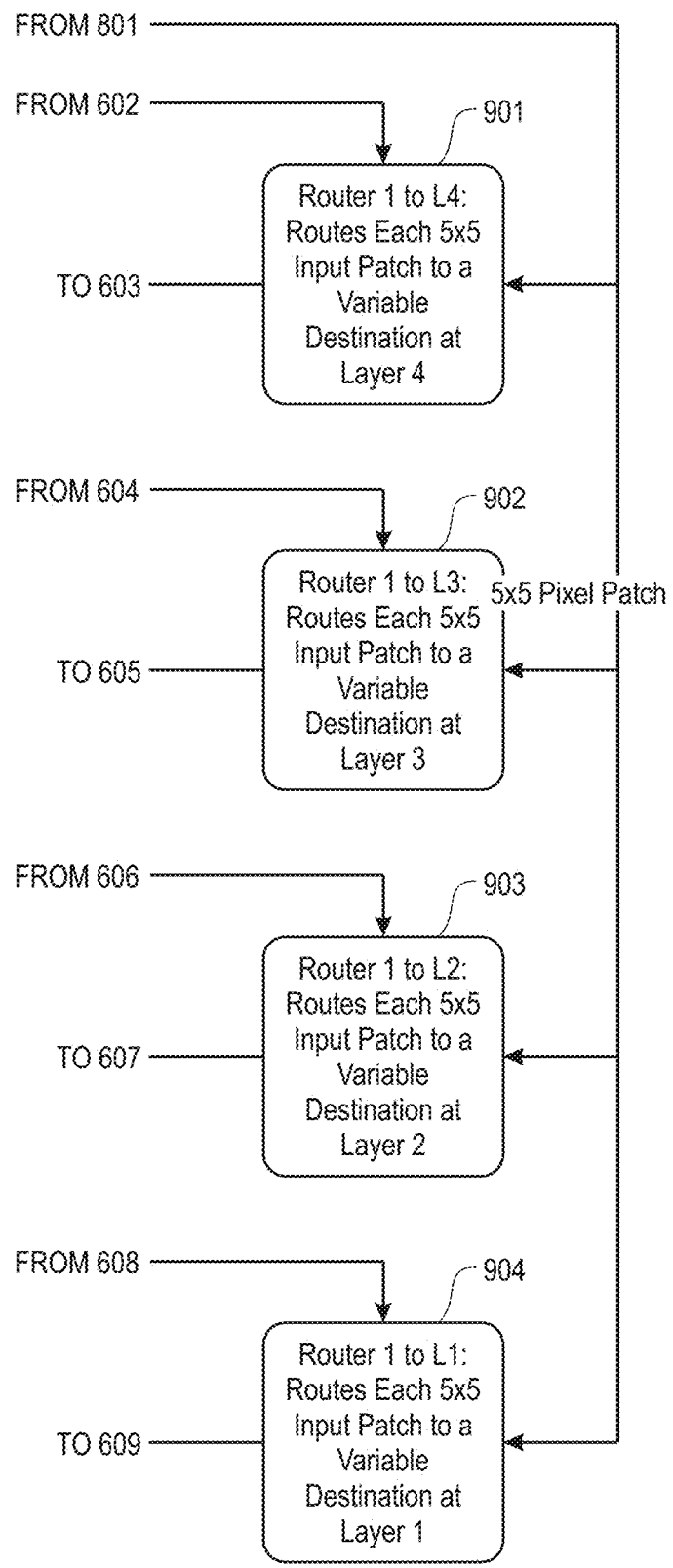
FIG. 9 illustrates a seventh portion of exemplary multiscale routing according to embodiments of the present disclosure.

In FIG. 9, the router/time-division-demultiplexer 801 (appearing in FIG. 8) sends its output to another router 901 . . . 904 assigned to a certain layer of the pyramid (603, 605, 607, 609). This router is responsible for sending the argmax output to the correct location in the feedback pyramid layer it is connected to. This in turn further refines the max location by using the gating mechanisms previously described. In some embodiments, these routers use the same neuron gates as above, where the "open" control axons get their input from counter gates of the feedback pyramid, and the input neurons of the routers get their input from the output of the router 801.

Figure 10:
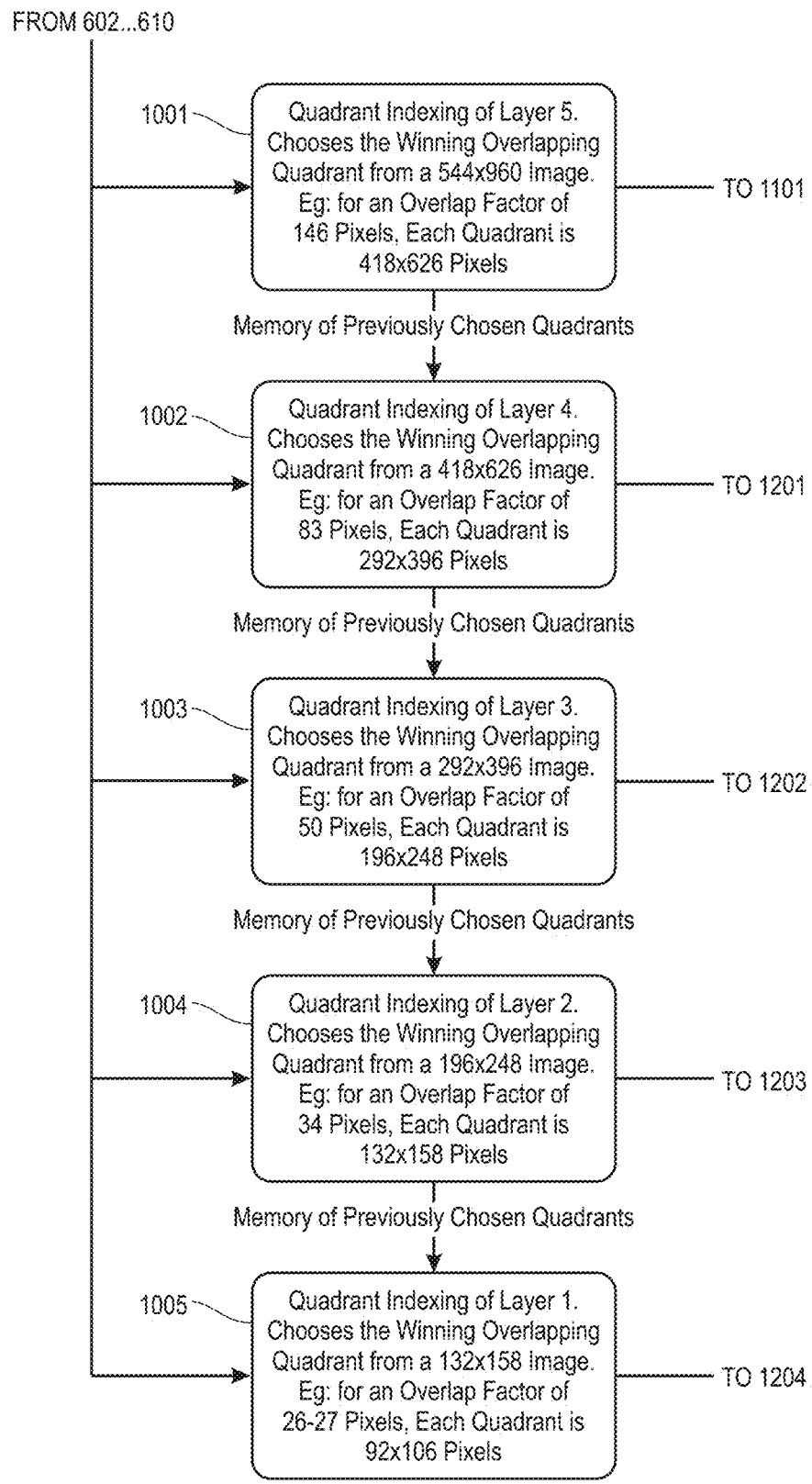
FIG. 10 illustrates a eighth portion of exemplary multiscale routing according to embodiments of the present disclosure.

In FIG. 10, another copy of the counter gates (FIG. 6) is used to recursively choose image quadrants that contain the maximum response pixel. The indexing pyramid uses gate neurons to select quadrants that have a sufficient number of votes both from the previous layer and from the counter gate (FIG. 6) of the current layer. This merging of the data from two sources is necessary since the quadrants are overlapping in order to maintain the loop invariant that even if part of an object lies near the border of a quadrant, close to its full surface will be routed to the outside for further analysis. This indexing mechanism output is then sent to the final component of the router which consists of more gates that recursively choose the corresponding image quadrant pixel values.

In some embodiments, the gates include Open and Close control axons, where a single spike is produced if the difference in the number of open and close control spikes is above a certain threshold. The neuron can accept open spikes through an open axon and optionally also close spikes via a close axon. If numSpikesOpen more open spikes than close spikes have entered, then a single output spike is generated and the neuron resets to 0. Initially the neuron gate is set to open, which means that at tick 0 a spike is generated. The control axons can affect each neuron individually, or a single control axon can be used to control all neurons in a core. There is also a reset axon which re-initializes the potential to zero and can be used to reset the gate's state.

Figure 11:
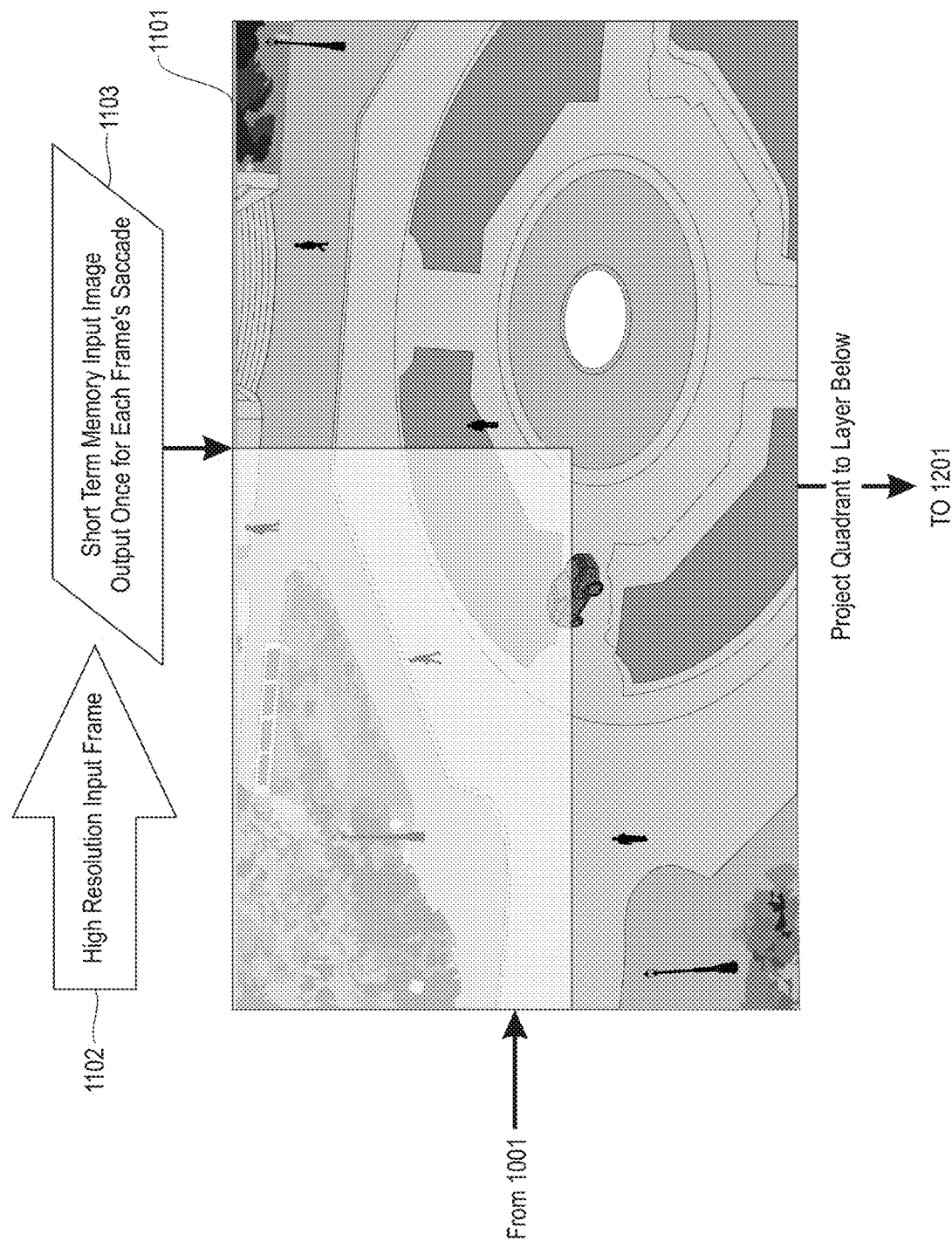
FIG. 11 illustrates a ninth portion of exemplary multiscale routing according to embodiments of the present disclosure.

In FIG. 11, for each layer the indexing mechanism outputs 1 spike specifying an overlapping image quadrant that should be released by the gate to the next layer below. In this example, the indexing mechanism chooses the top left quadrant of the image 1101 as containing the target of interest, which is a bicyclist in this case. In this example, the high resolution input frame is separately input 1102, and then output once for each frame's saccade 1103.

Figure 12:
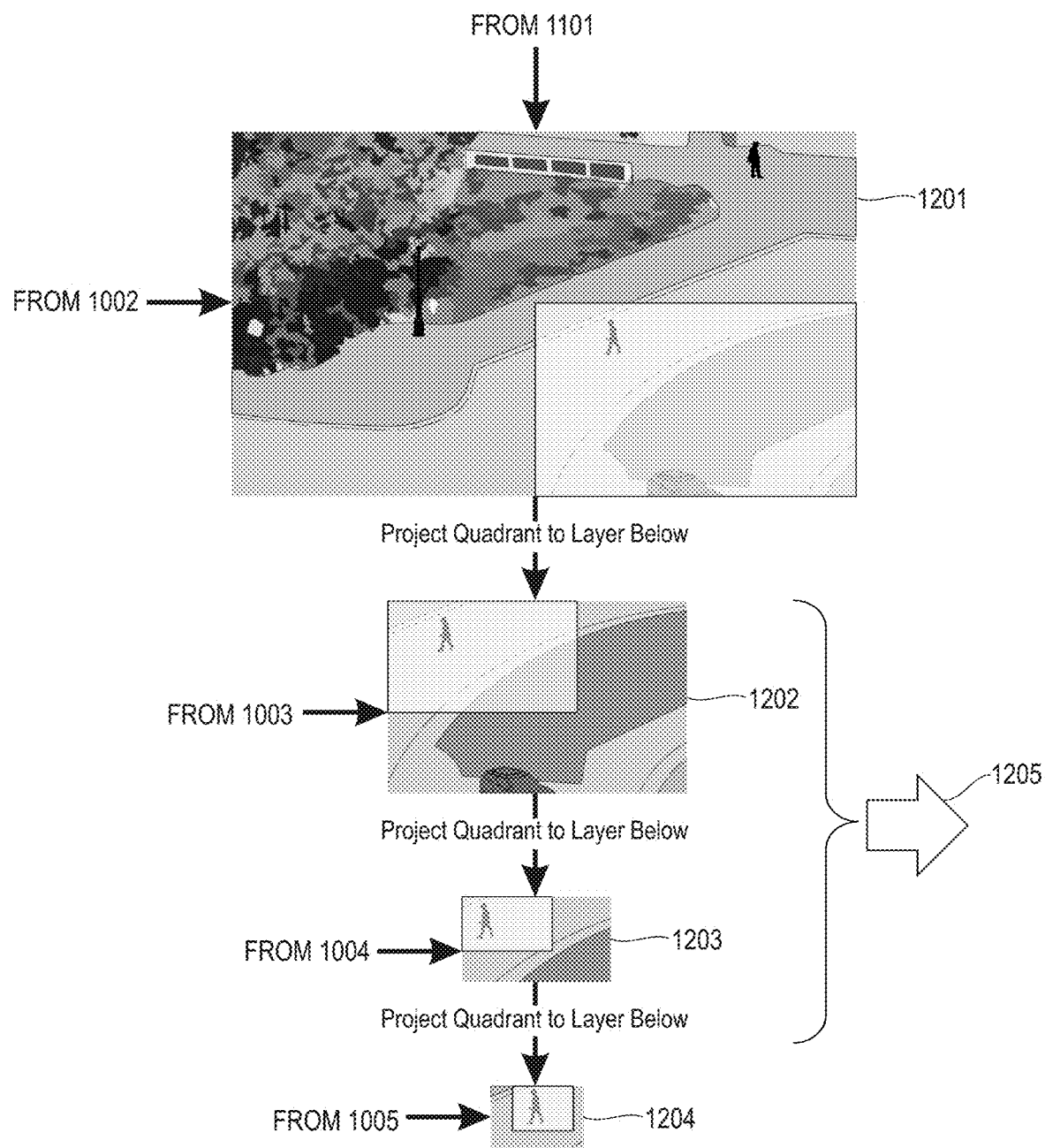
FIG. 12 illustrates a tenth portion of exemplary multiscale routing according to embodiments of the present disclosure.

In FIG. 12, a corelet for recursively pruning image quadrants is implemented. Each of the 4 quadrants in an image can be opened using global "open" pulses which arrive from the output of the indexing mechanism (FIG. 10). The output of each layer is used as the input of the next layer and a recursive quadrant selection finally enables us to localize the object and a sequence of patches all of which contain the object of interest. The overlapping quadrant borders help in cases where the target of interest lies near the central x or y coordinate of the patch. It thus provides the loop invariant that the whole object always lies inside the subpatch. At 1205, subset of the pyramidal patches are output. Larger patches are useful for context calculations and for large objects.

In some embodiments, the gate neurons are configured to release the gated/stored input spikes, when the gate is not fully closed, thus enabling the release of only part of the stored information. The gate can be closed and opened multiple times between frames. This gate is meant to accept at most maxSpikesPerFrame input spikes between every pair of reset spikes. It also uses open control spikes, and optional close spikes. If numSpikesOpen more open spikes are received than close spikes, then the gate becomes open and it lets through any input spikes entered since the last reset and until the next reset. Note that at any time, the number of close spikes must be at most equal to the number of open spikes that have occurred since the last reset. Upon reset the gate is set to its closed state. However for the first frame the gate is set to the open state. It is also possible to re-close the gate without a reset, by using at most numSpikesOpen close pulses, in which case the same number of open pulses are needed to reopen the gate. So the number of close and open can be thought of as encoding how fully the gate is closed.

Figure 13:
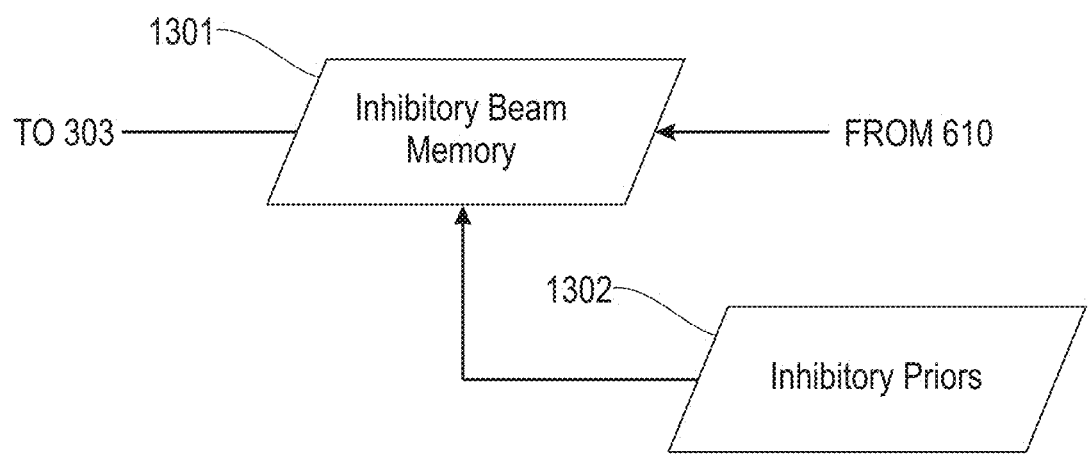
FIG. 13 illustrates a eleventh portion of exemplary multiscale routing according to embodiments of the present disclosure.

In FIG. 13, inhibitory beam memory 1301 receives output from gate 610 and provides a signal to gate 303.

Figure 14:
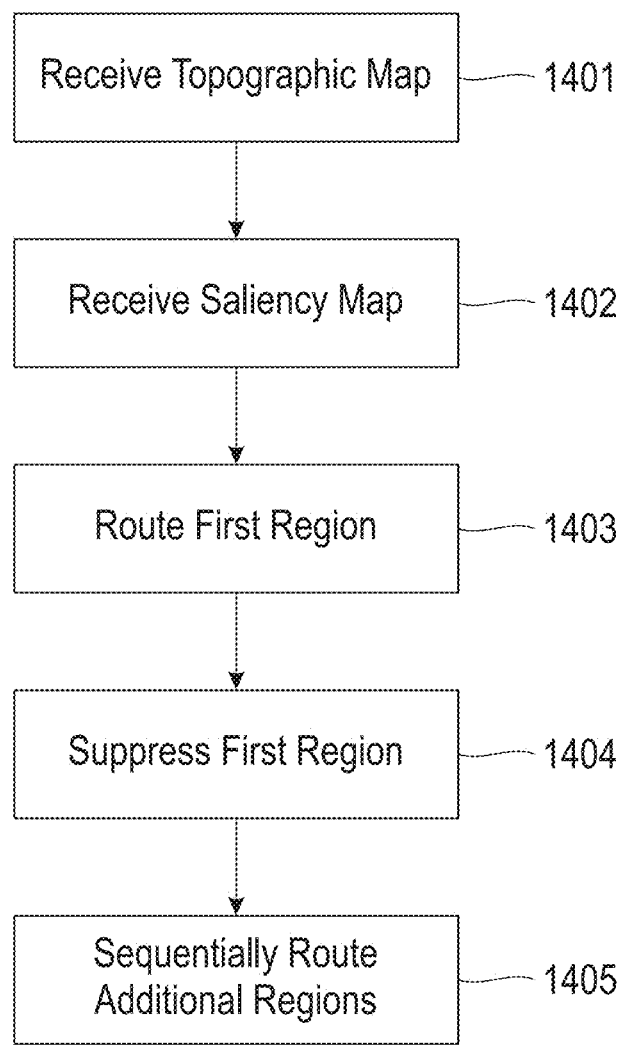
FIG. 14 illustrates a method of multiscale routing according to embodiments of the present disclosure.

Referring to FIG. 14, a method of dynamic multiscale routing is illustrated according to embodiments of the present disclosure. At 1401, an input topographic map is received at a spiking neuromorphic system. At 1402, a saliency map is received, associating a saliency value with each of a plurality of regions of the input topographic map. At 1403, based on the saliency map, a first of the plurality of regions in order of saliency value is routed. At 1404, the first of the plurality of regions is suppressed. At 1405, based on the saliency map, a predetermined number of the plurality of regions are sequentially routed in order of saliency value.

Figure 15:
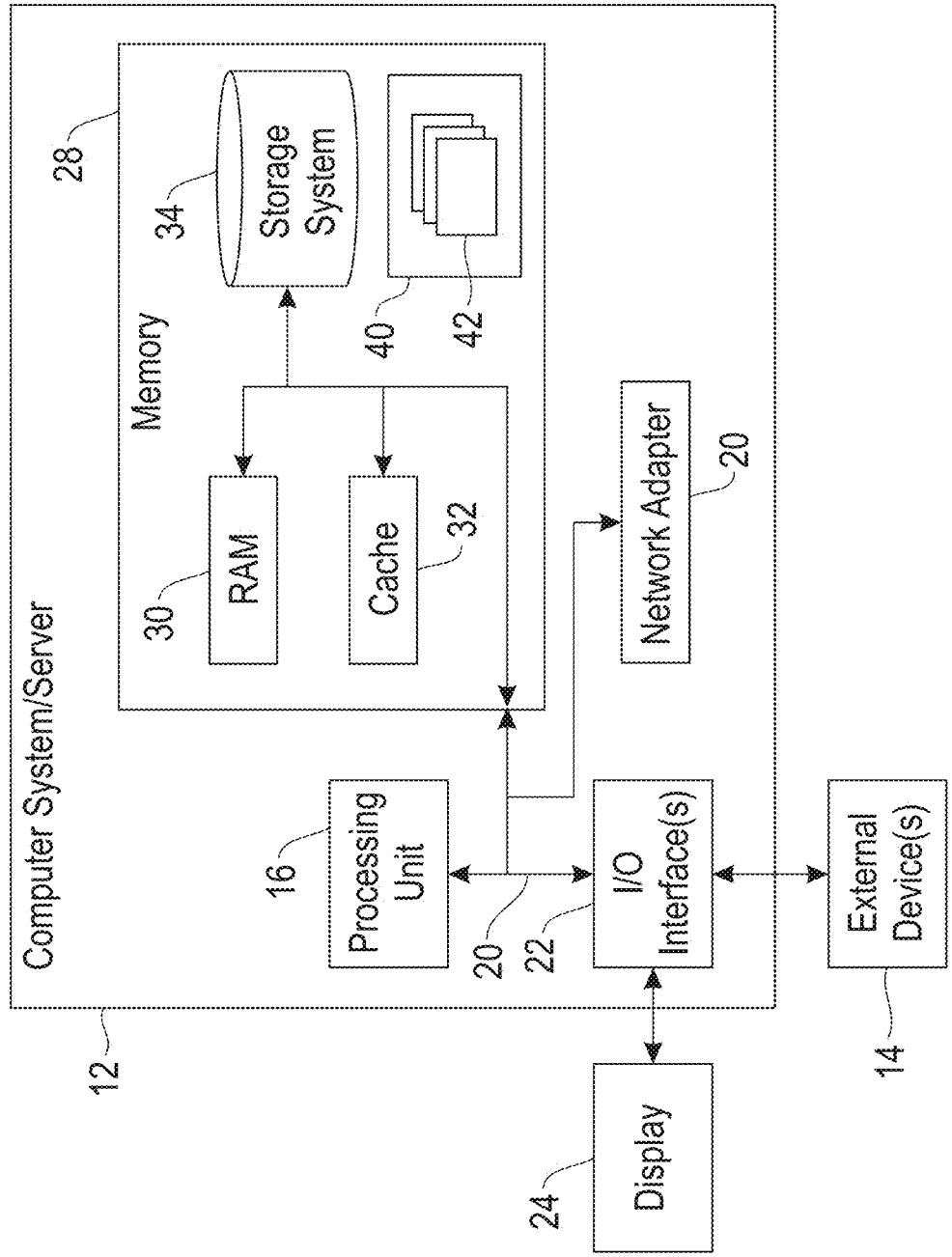
FIG. 15 depicts a computing node according to an embodiment of the present invention.

Referring now to FIG. 15, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving an input topographic map at a spiking neuromorphic hardware system;
    receiving a saliency map associating a saliency value with each of a plurality of regions of the input topographic map;
    generating a plurality of representations of the saliency map, each representation having a different resolution;
    determining the order of the saliency value based on the plurality of representations;
    routing a first of the plurality of regions in order of the saliency value;
    suppressing the first of the plurality of regions after a first saccade;
    sequentially routing a predetermined number of the plurality of regions in order of the saliency value based on the saliency map, wherein the predetermined number corresponds to a number of saccades; and
    sequentially suppressing each of the predetermined number of the plurality of regions after its routing,
    wherein determining the order of the saliency value comprises:
        applying a Gaussian pyramid to the plurality of representations to determine a focus, the Gaussian pyramid having a fan-in; and
        backprojecting the focus over the plurality of representations.

2. The method of claim 1, further comprising:
    sequentially receiving additional input topographic maps at the spiking neuromorphic system.

3. The method of claim 1, wherein the backprojecting comprises applying a fan-out corresponding to the fan-in.

4. The method of claim 1, wherein the input topographic map comprises an image.

5. The method of claim 4, wherein the image comprises a frame of a video.

6. A system comprising:
    a spiking neurosynaptic hardware system comprising a plurality of axons and neurons, the spiking neurosynaptic hardware system performing a method comprising:
    receiving an input topographic map;
    receiving a saliency map associating a saliency value with each of a plurality of regions of the input topographic map;
    generating a plurality of representations of the saliency map, each representation having a different resolution;
    determining the order of the saliency value based on the plurality of representations;
    routing a first of the plurality of regions in order of the saliency value;
    suppressing the first of the plurality of regions after a first saccade;
    sequentially routing a predetermined number of the plurality of regions in order of the saliency value based on the saliency map, wherein the predetermined number corresponds to a number of saccades; and
    sequentially suppressing each of the predetermined number of the plurality of regions after its routing,
    wherein determining the order of the saliency value comprises:
        applying a Gaussian pyramid to the plurality of representations to determine a focus, the Gaussian pyramid having a fan-in; and
        backprojecting the focus over the plurality of representations.

7. The system of claim 6, wherein the spiking neurosynaptic hardware system is further adapted to:
    sequentially receive additional input topographic maps at the spiking neuromorphic system.

8. The system of claim 6, wherein the backprojecting comprises applying a fan-out corresponding to the fan-in.

9. The system of claim 6, wherein the input topographic map comprises an image.

10. The system of claim 9, wherein the image comprises a frame of a video.

11. A computer program product for dynamic multiscale routing, the computer program product comprising a computer readable storage medium having program instructions embodied therewith, the program instructions readable by a spiking neurosynaptic hardware system to cause the spiking neurosynaptic hardware system to perform a method comprising:
- receiving an input topographic map;
- receiving a saliency map associating a saliency value with each of a plurality of regions of the input topographic map;
- generating a plurality of representations of the saliency map, each representation having a different resolution;
- determining the order of the saliency value based on the plurality of representations;
- routing a first of the plurality of regions in order of the saliency value;
- suppressing the first of the plurality of regions after a first saccade;
- sequentially routing a predetermined number of the plurality of regions in order of the saliency value based on the saliency map, wherein the predetermined number corresponds to a number of saccades; and
- sequentially suppressing each of the predetermined number of the plurality of regions after its routing, wherein determining the order of the saliency value comprises:
- applying a Gaussian pyramid to the plurality of representations to determine a focus, the Gaussian pyramid having a fan-in; and
- backprojecting the focus over the plurality of representations.

12. The computer program product of claim 11, the method further comprising: sequentially receiving additional input topographic maps at the spiking neuromorphic system.

13. The computer program product of claim 11, wherein the input topographic map comprises an image.

14. The computer program product of claim 13, wherein the image comprises a frame of a video.

* * * * *